US009766362B2

(12) United States Patent
Li et al.

(10) Patent No.: US 9,766,362 B2
(45) Date of Patent: Sep. 19, 2017

(54) SYSTEM AND METHOD FOR USING DUAL TELEMETRY

(71) Applicant: Schlumberger Technology Corporation, Sugar Land, TX (US)

(72) Inventors: Qiming Li, Sugar Land, TX (US); Desheng Zhang, Missouri City, TX (US); Yi Zhang, Sugar Land, TX (US); Lili Zhong, Missouri City, TX (US); Xueyuan Tang, Sugar Land, TX (US); Brian Oliver Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 787 days.

(21) Appl. No.: 13/971,777

(22) Filed: Aug. 20, 2013

(65) Prior Publication Data

US 2014/0055277 A1 Feb. 27, 2014

Related U.S. Application Data

(63) Continuation of application No. 12/538,961, filed on Aug. 11, 2009, now Pat. No. 8,629,782, and a
(Continued)

(51) Int. Cl.
*G01V 3/18* (2006.01)
*E21B 47/12* (2012.01)
(Continued)

(52) U.S. Cl.
CPC ............... *G01V 3/18* (2013.01); *E21B 47/12* (2013.01); *E21B 47/122* (2013.01); *E21B 47/18* (2013.01); *G01V 11/002* (2013.01)

(58) Field of Classification Search
None
See application file for complete search history.

(56) References Cited

U.S. PATENT DOCUMENTS 2,352,833 A 7/1944 Hassler
2,700,131 A 1/1955 Otis et al.
(Continued)

FOREIGN PATENT DOCUMENTS

EP 0078906 5/1983
GB 1316617 5/1973
(Continued)

OTHER PUBLICATIONS

R. Hutin, et al, "New Mud Pulse Telemetry Techniques for Deepwater Applications and Improved Real-Time Data Capabilities," SPE IADC 67762, 2001.
(Continued)

*Primary Examiner* — Brian Wilson
*Assistant Examiner* — Shawna M Kingston

(57) ABSTRACT

A system and a method use dual telemetry for tools located in a wellbore. A first telemetry system and a second telemetry system coordinate communication with the tools. Both the first telemetry system and the second telemetry system may transmit data regarding the tools and/or drilling conditions from the tools to a surface location simultaneously. The first telemetry system or the second telemetry system may communicate with the surface location if communication using the other telemetry system is interrupted. The first telemetry system and the second telemetry system may have a master/slave relationship so that data requests from a specific telemetry system do not interfere with data requests from the other telemetry system.

16 Claims, 7 Drawing Sheets

Related U.S. Application Data continuation-in-part of application No. 11/614,444, filed on Dec. 21, 2006, now Pat. No. 8,004,421, and a continuation-in-part of application No. 11/382,598, filed on May 10, 2006, now abandoned.

(60) Provisional application No. 60/697,073, filed on Jul. 5, 2005.

(51) Int. Cl.
*E21B 47/18* (2012.01)
*G01V 11/00* (2006.01)

(56) References Cited

U.S. PATENT DOCUMENTS

| | | | |
|---|---|---|---|
| 3,065,416 A | 11/1962 | Jeter |
| 3,309,656 A | 3/1967 | Godbey |
| 3,713,089 A | 1/1973 | Clacomb |
| 3,716,830 A | 2/1973 | Garcia |
| 3,764,970 A | 10/1973 | Manning |
| 4,057,781 A | 11/1977 | Scherbatskoy |
| RE29,734 E | 8/1978 | Manning |
| 4,262,343 A | 4/1981 | Claycomb |
| 4,320,470 A | 3/1982 | Angehrn |
| 4,329,734 A | 5/1982 | Latos |
| 4,402,068 A | 8/1983 | Angehrn |
| 4,535,429 A | 8/1985 | Russell et al. |
| 4,715,022 A | 12/1987 | Yeo |
| 4,725,837 A | 2/1988 | Rubin |
| 4,771,406 A | 9/1988 | Oishi et al. |
| 4,771,408 A | 9/1988 | Kotlyar |
| 4,847,815 A | 7/1989 | Malone |
| 4,945,761 A | 8/1990 | Lessi et al. |
| 4,979,112 A | 12/1990 | Ketcham |
| 5,125,152 A | 6/1992 | Grasmueller et al. |
| 5,128,901 A | 7/1992 | Drumheller |
| 5,146,433 A | 9/1992 | Kosmala et al. |
| 5,160,925 A | 11/1992 | Dalley et al. |
| 5,182,730 A | 1/1993 | Scherbatskoy |
| 5,215,152 A | 6/1993 | Duckworth |
| 5,237,540 A | 8/1993 | Malone |
| 5,249,161 A | 9/1993 | Jones et al. |
| 5,274,060 A | 12/1993 | Schadeli |
| 5,274,606 A | 12/1993 | Drumheller et al. |
| 5,375,098 A | 12/1994 | Malone et al. |
| 5,396,232 A | 3/1995 | Mathieu et al. |
| 5,448,227 A | 9/1995 | Orban et al. |
| 5,517,464 A | 5/1996 | Lerner et al. |
| 5,517,484 A | 5/1996 | Takagi et al. |
| 5,563,827 A | 10/1996 | Lee et al. |
| 5,586,084 A | 12/1996 | Barron et al. |
| 5,642,051 A | 6/1997 | Babour et al. |
| 5,774,420 A | 6/1998 | Heysse et al. |
| 5,886,303 A | 3/1999 | Rodney |
| 6,078,868 A | 6/2000 | Dubinsky |
| 6,219,301 B1 | 4/2001 | Moriarty |
| 6,262,343 B1 | 7/2001 | Staskawicz et al. |
| 6,396,276 B1 | 5/2002 | Van Steenwyk et al. |
| 6,421,296 B1 | 7/2002 | Lin et al. |
| 6,421,298 B1 | 7/2002 | Beattie et al. |
| 6,626,253 B2 | 9/2003 | Hahn et al. |
| 6,641,434 B2 | 11/2003 | Boyle et al. |
| 6,741,185 B2 | 5/2004 | Shi et al. |
| 6,788,219 B2 | 9/2004 | Sun et al. |
| 6,866,306 B2 | 3/2005 | Boyle et al. |
| 6,898,150 B2 | 5/2005 | Hahn et al. |
| 6,909,667 B2 | 6/2005 | Shah et al. |
| 7,040,415 B2 | 5/2006 | Boyle et al. |
| 7,163,065 B2 | 1/2007 | Zhang et al. |
| 7,228,908 B2 | 6/2007 | East, Jr. et al. |
| 7,397,388 B2 | 7/2008 | Huang et al. |
| 7,573,397 B2 | 8/2009 | Petrovic et al. |
| 7,894,302 B2 | 2/2011 | Aello et al. |
| 8,164,476 B2 | 4/2012 | Hache et al. |
| 2002/0163334 A1 | 11/2002 | Hagiwara |
| 2003/0151522 A1 | 8/2003 | Jeffryes et al. |
| 2003/0151977 A1 | 8/2003 | Shah et al. |
| 2003/0151978 A1 | 8/2003 | Jeffryes et al. |
| 2004/0124994 A1 | 7/2004 | Oppelt |
| 2004/0163822 A1 | 8/2004 | Zhang et al. |
| 2005/0000733 A1 | 1/2005 | Schaaf |
| 2005/0012637 A1 | 1/2005 | Golla et al. |
| 2005/0024231 A1 | 2/2005 | Fincher et al. |
| 2005/0024232 A1 | 2/2005 | Gardner et al. |
| 2005/0087368 A1 | 4/2005 | Boyle et al. |
| 2005/0167098 A1 | 8/2005 | Lovell et al. |
| 2005/0260089 A1 | 11/2005 | Hahn et al. |
| 2005/0284659 A1 | 12/2005 | Hall et al. |
| 2006/0214814 A1 | 9/2006 | Pringnitz et al. |
| 2007/0045006 A1 | 3/2007 | Krueger et al. |
| 2007/0062692 A1 | 3/2007 | Estevez et al. |
| 2007/0247328 A1 | 10/2007 | Petrovic et al. |
| 2008/0037369 A1 | 2/2008 | Hentati |
| 2010/0201540 A1 | 8/2010 | Li et al. |

FOREIGN PATENT DOCUMENTS

| | | |
|---|---|---|
| GB | 2121572 | 12/1983 |
| GB | 2147722 | 5/1985 |
| GB | 2361789 | 10/2001 |
| GB | 2372521 | 8/2002 |
| GB | 2428054 | 1/2007 |
| GB | 2449004 | 11/2008 |
| WO | 01/46548 | 6/2001 |
| WO | 2004/085796 | 10/2004 |
| WO | 2006/099362 | 9/2006 |

OTHER PUBLICATIONS

N. Tokov and R. Stewart, "Vertical Seismic Profiling," V14B, pp. 288-301, Geophysical Press, London (1984).

Hardage, "Vertical Seismic Profiling," V. 14A pp. 147-220, Geophysical. Press (London 1985).

SYSTEM AND METHOD FOR USING DUAL TELEMETRY

This application is a continuation of U.S. Ser. No. 12/538,961, entitled "System and Method for Using Dual Telemetry", filed on Aug. 11, 2009, which is a continuation-in-part of U.S. Ser. No. 11/614,444, ("the '444 application") entitled "Wellbore Telemetry and Noise Cancellation Systems and Method For the Same", filed on Dec. 21, 2006 which is a continuation-in-part of U.S. Ser. No. 11/382,598, ("the '598 application") entitled "Wellbore Telemetry System and Method" filed on May 10, 2006, which is now abandoned. The '444 application and the '598 application are each incorporated by reference in their entireties.

BACKGROUND OF THE INVENTION

The present invention generally relates to a system and a method for using dual telemetry for tools located in a wellbore. More specifically, the present invention relates to a first telemetry system and a second telemetry system that may coordinate communication with the tools. The first telemetry system and the second telemetry system may be used to transmit data regarding the tools, wellbore, formation, drillstring or wellbore conditions from the wellbore to a surface location. The first telemetry system and the second telemetry system may communicate with the surface location if communication using the other telemetry system is interrupted.

To obtain hydrocarbons, a drilling tool is driven into the ground surface to create a borehole through which the hydrocarbons are extracted. Typically, a drill string is suspended within the borehole. The drill string has a drill bit at a lower end of the drill string. The drill string extends from the surface to the drill bit. The drill string has a bottom hole assembly (BHA) located proximate to the drill bit.

Drilling operations typically require monitoring to determine the trajectory of the borehole. Measurements of drilling conditions, such as, for example, drift of the drill bit, inclination and azimuth, may be necessary for determination of the trajectory of the borehole, especially for directional drilling.

The BHA may have tools that may generate and/or may obtain information regarding the wellbore, a formation surrounding the wellbore and drilling conditions. Technology for transmitting information within a wellbore, known as telemetry technology, is used to transmit the information from the tools of the BHA to the surface for analysis. The information may be used to control the tools. Accurate real-time information regarding the tools, the wellbore, the formation and the drilling conditions may enable prevention and/or detection of a drilling problem, such as, for example, a hazard region which the drilling tool must avoid, a blowout, casing wear and/or the like. Moreover, adjustment of the drilling operations in response to accurate real-time information may enable optimization of the drilling process to increase a rate of penetration of the drill bit, reduce a drilling time and/or optimize a placement of the wellbore.

Drilling fluid, such as, for example, mud, may be pumped through a conduit in the drill string. The drilling fluid may be used to transmit the information regarding the drilling tool and the drilling conditions to the surface location. For example, the flow of the mud through the drill string may be modulated to cause pressure and/or flow rate variations proximate to the surface location as known to one skilled in the art as "mud-pulse telemetry."

Wired drill pipe, such as the wired drill pipe infrastructure described in U.S. Pat. No. 6,641,434, enables high-speed transmission of the information from the tools to the surface location. The wired drill pipe infrastructure may have communication cables embedded in the drill pipe for transmittal of the information. In addition, the communication cables may be connected to coupling devices located at each joint of the drill pipe to enable transmission of the information and transmission of the drilling fluid through the drill pipe.

The wired drill pipe enables high-speed transmission of the information from the sensors to the surface location. The high-speed transmission by the wired drill pipe may provide a data transmission rate that may be orders of magnitude greater then a data transmission rate of other telemetry technologies, such as, for example, mud pulse telemetry or electronic pulse telemetry. The high-speed transmission by the wired drill pipe may also provide data transmission from relatively distant drilling depths. However, the communication channel provided by the wired drill pipe may be interrupted, such as, for example, if adjacent joints of the wired drill pipe are separated. Therefore, use of both mud pulse telemetry and wired drill pipe telemetry may be advantageous.

However, use of both mud pulse telemetry and wired drill pipe telemetry may be difficult because each telemetry system may attempt to request data from and/or control a tool simultaneously. Communication between a tool and a wired drill pipe telemetry system may interfere with communication between a tool and a mud pulse telemetry system.

DETAILED DESCRIPTION OF THE PRESENTLY PREFERRED EMBODIMENTS

The present invention generally relates to a system and a method for using dual telemetry for tools located in a wellbore. In an embodiment, the present invention relates to a wired drill pipe telemetry system and a mud pulse telemetry system that may coordinate communication with the tools, sensors or other drill string components. The wired drill pipe telemetry system and the mud pulse telemetry system may be used to transmit data regarding the tools, drill string, formation and/or wellbore conditions from the wellbore to a surface location. In the aforementioned embodiment, both the wired drill pipe telemetry system and the mud pulse telemetry system may communicate with the surface location simultaneously. The wired drill pipe telemetry system or the mud pulse telemetry system may communicate with the surface location if communication using the other telemetry system is interrupted. The wired drill pipe telemetry system and the mud pulse telemetry system may have a master/slave relationship so that communication between the tools and a specific telemetry system do not interfere with communication between the tools and the other telemetry system.

Figure 1:
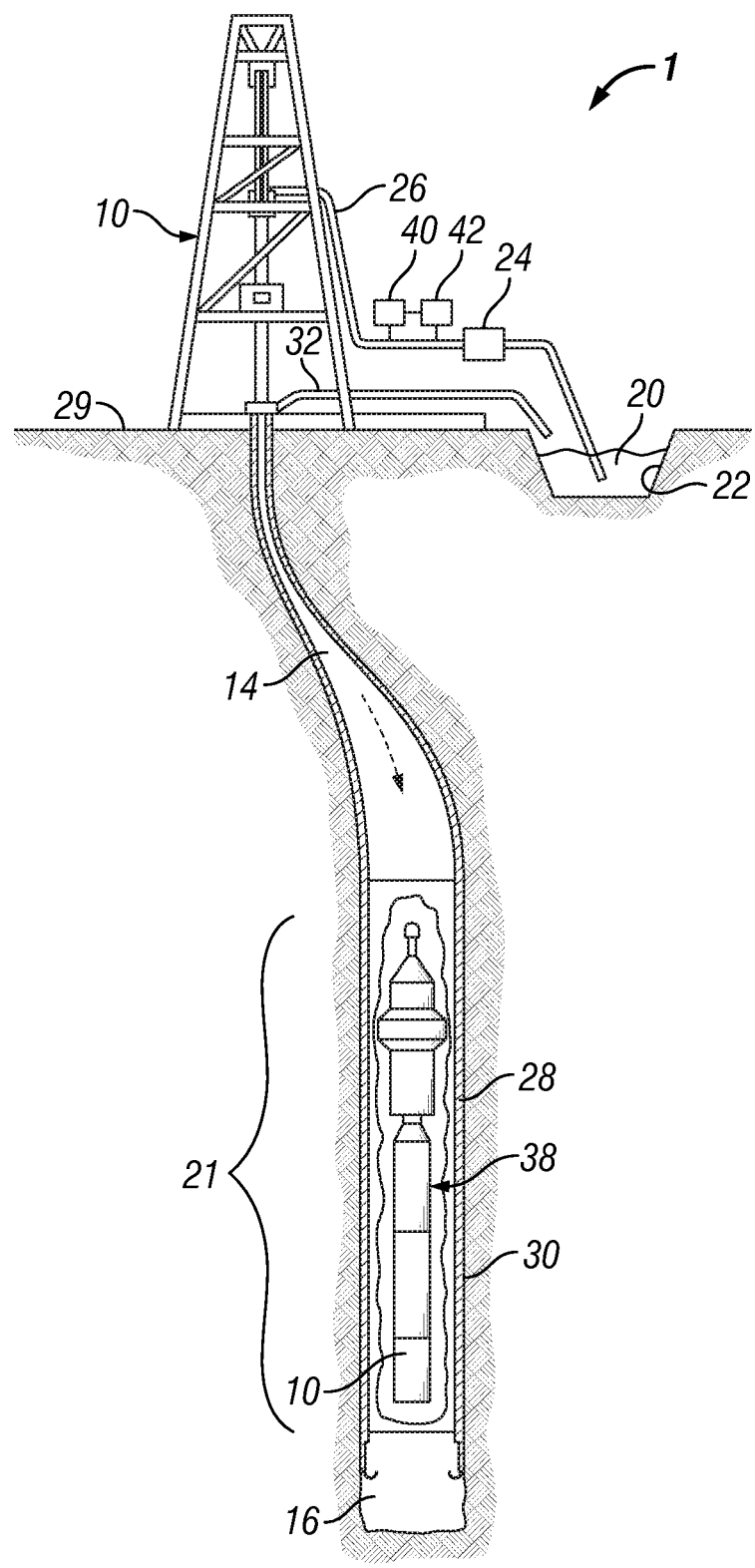
FIG. 1 illustrates a drill string in an embodiment of the present invention.

Referring now to the drawings wherein like numerals refer to like parts, FIG. 1 generally illustrates a borehole 30 that may penetrate a formation in an embodiment of the present invention. A platform assembly 10 may be located at a surface location 29. The platform assembly 10 may be positioned over the borehole 30. A drill string 14 may be suspended within the borehole 30. The drill string 14 may have a drill bit 16 and a bottom hole assembly 21 (hereafter "the BHA 21") that may be located adjacent to the drill bit 16. The drill bit 16 may be rotated by imparting rotation on the drill string 14, and/or a motor or other device (not shown) may be provided with the drill string 14 to rotate the drill bit 16.

A drilling fluid 20, such as, for example, mud, may be drawn from a reservoir 22 using a first fluid line 26 that may have one or more pumps 24. The pump 24 may direct the drilling fluid 20 through the drill string 14 and the drill bit 16. The drilling fluid may travel through an annulus 28 that may be located between the drill string 14 and a wall of the borehole 30. A second fluid line 32 may extend from the annulus 28 to the reservoir 22 and may direct the drilling fluid 20 from the annulus 28 to the reservoir 22.

One or more tools 10 may be associated with the BHA 21 and/or the drill string 14. The tools 10 may provide measurements regarding the borehole 30, a formation that may surround the borehole 30, the drill string 14 and/or any component of the drill string 14. For example, the tools 10 may be and/or may have a measurement-while-drilling ("MWD") tool, a logging-while-drilling ("LWD") tool, a strain measuring device, a torque measuring device, a temperature measuring device, a seismic tool, a resistivity tool, a direction measuring device, an inclination measuring device, a weight-on-bit measuring device, a vibration measuring device, a shock measuring device, a stick-slip measuring device, a drilling tool used to create the borehole 30 and/or the like. In an embodiment, the tools 10 may be a wireline configurable tool, such as a tool commonly conveyed by wireline cable as known to one having ordinary skill in the art. The present invention is not limited to a specific embodiment of the tools 10. FIG. 1 depicts the tools 10 in association with the BHA 21, but the present invention is not limited to a specific location of the tools 10 within the drill string 14.

The tools 10 may have capabilities for measuring, processing and/or storing information, as well as for communicating with the surface location 29. The tools 10 may have a sensor for determining a characteristic of the formation, borehole 30, the drill string 14, the drilling fluid 20, such as, for example, a temperature sensor, a pressure sensor, a flow rate measurement device, a gauge, an oil/water/gas ratio measurement device, a scale detector, a vibration sensor, a sand detection sensor, a water detection sensor, a viscosity sensor, a density sensor, a bubble point sensor, a composition sensor, a resistivity array sensor, an acoustic sensor, a near infrared sensor, a gamma ray detector, a $H_2S$ detector, a $CO_2$ detector and/or the like.

The tools 10 may measure, may record and/or may transmit data acquired from or through the borehole 30 (hereinafter "the data"). The data may relate to the borehole 30 and/or the formation that may surround the borehole 30, such as a temperature, a pressure, a depth, a composition, a density and/or the like. The data may relate to one or more characteristics of the drill string 14, such as, for example, an amount of stretch, an amount of strain, an angle, a direction, a characteristic of fluid flowing through the drill string 14, a dog-leg severity and/or the like. For example, the data may indicate a trajectory of the borehole 30, a depth of the borehole 30, a width of the borehole 30 and/or the like. Further, the data may be and/or may indicate, for example, a location of the drill bit 16, an orientation of the drill bit 16, a weight applied to the drill bit 16, a rate of penetration, properties of an earth formation being drilled, properties of an earth formation and/or a hydrocarbon reservoir located proximate to the drill bit 16, fluid conditions, fluids collected and/or the like. Still further, the data may comprise, for example, resistivity measurements, neutron porosity measurements, azimuthal gamma ray measurements, density measurements, elemental capture spectroscopy measurements, neutron gamma density measurements that measure gamma rays generated from neutron formation interactions, sigma measurements and/or the like. The data may be and/or may indicate an inclination of the borehole 30 and/or an azimuth of the borehole 30, for example. The data may indicate annular pressure, three-axis shock and/or vibration. The data may be measured and/or obtained at predetermined time intervals, at predetermined depths, at request by a user and/or the like. The present invention is not limited to a specific embodiment of the data.

Figure 2:
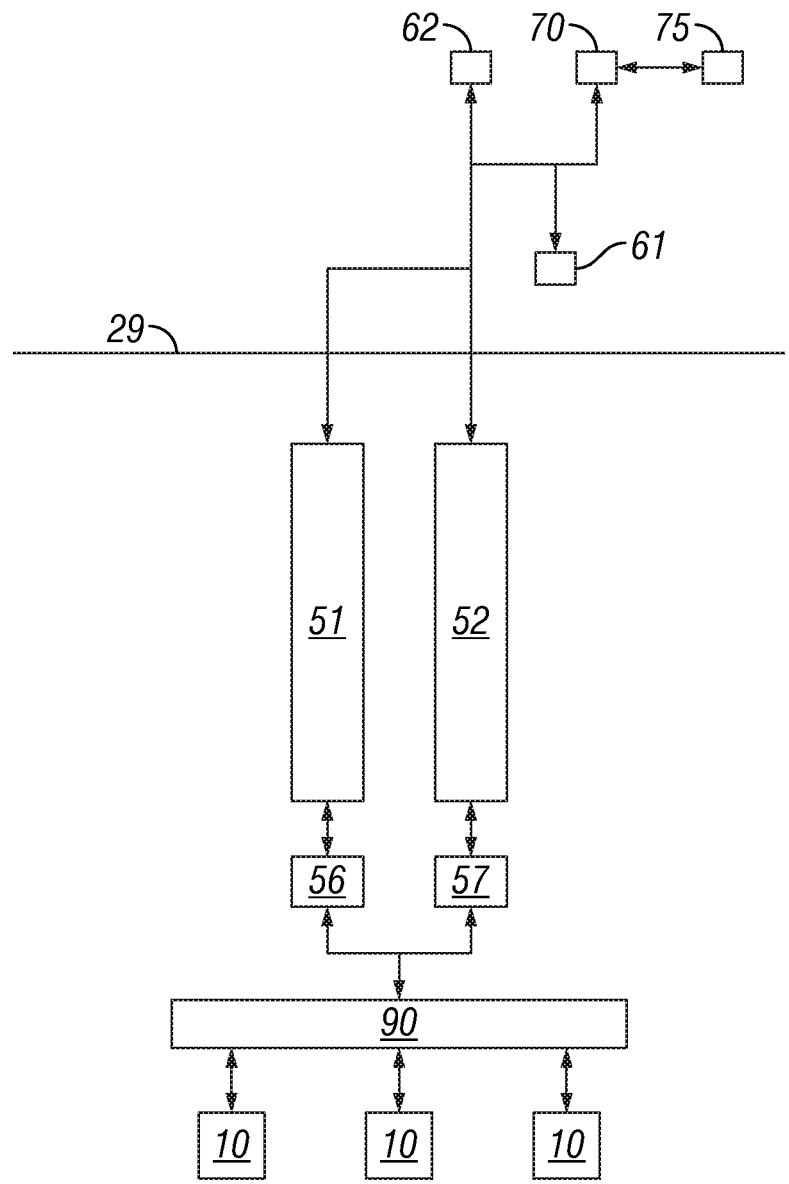
FIG. 2 illustrates a black box diagram of a system for managing and/or using drilling data in an embodiment of the present invention.

FIG. 2 generally illustrates that the drilling system 1 may have a first telemetry system 51 and a second telemetry system 52. The first telemetry system 51 and the second telemetry system 52 may transmit the data from the tools 10 to the surface location 29. The first telemetry system 51 and the second telemetry system 52 may be any known telemetry system, such as, for example, a mud pulse telemetry system, wired drill pipe, an electromagnetic telemetry system, an acoustic telemetry system, a torsional telemetry system, a hybrid telemetry system that may combine the above-described telemetry systems and other systems for transmitting information between a borehole 30 and the surface location 29, such as a wireline cable. An example of a mud pulse telemetry system is described in U.S. Pat. No. 5,517,464 to Lerner et al.; an example of a wired drill pipe is described in U.S. Pat. Nos. 6,641,434 and 6,866,306 to Boyle et al.; an example of an electromagnetic telemetry system is described in U.S. Pat. No. 5,642,051 to Babour et al.; and an example of an acoustic telemetry system is described in PCT Patent App. Pub. No. WO/2004/085796 to Huang et al. Each of these references is incorporated herein by reference in its entirety. The mud pulse telemetry system and the wired drill pipe are also described in further detail hereafter.

As discussed previously, the first telemetry system 51 and/or the second telemetry system 52 may be a hybrid telemetry system. For example, the first telemetry system 51 and/or the second telemetry system 52 may have wired drill pipe that extends from the surface location 29 to a position within the borehole 30 and a mud pulse telemetry system that extends from the position within the borehole 30 to the BHA 21. The present invention is not limited to a specific embodiment of the first telemetry system 51 or the second telemetry system 52. The first telemetry system 51 and the second telemetry system 52 may be any telemetry system capable of transmitting the data from the tools 10 to the surface location 29 as known to one having ordinary skill in the art.

A first terminal 61 may be connected to the first telemetry system 51 and/or the second telemetry system 52. The first telemetry system 51 and/or the second telemetry system 52 may transmit the data from the tools 10 to the first terminal 61. As a further example, the first terminal 61 may be connected to the first telemetry system 51, and a second terminal 62 may be connected to the second telemetry system 52. The first telemetry system 51 may transmit the data to the first terminal 60, and the second telemetry system 52 may transmit the data to the second terminal 60. The first telemetry system 51 and/or the second telemetry system 52 may transmit signals from the first terminal 61 and/or the second terminal 62 to the tools 10. For example, the signals may be based on user input on the first terminal 61 and/or the second terminal 62. In an embodiment, the signals may request the data, may direct the tools 10 to obtain the data, may control operations of the tools 10 and/or the like.

The first terminal 61 and the second terminal 62 may be a computer or processing device for storing, analyzing, manipulating and organizing data. Examples of the first terminal 61 and the second terminal include a desktop computer, a laptop computer, a mobile cellular telephone, a personal digital assistant ("PDA"), a 4G mobile device, a 3G mobile device, a 2.5G mobile device, an internet protocol (hereinafter "IP") video cellular telephone, an ALL-IP electronic device, a satellite radio receiver, a portable digital audio player, a portable digital video player and/or the like. The first terminal 61 and the second terminal 62 may be any device that has a capability to communicate with the first telemetry system 51 and/or the second telemetry system 52. The first terminal 61 and/or the second terminal 62 may be remote relative to the drill string 14. The present invention is not limited to a specific embodiment of the first terminal 61 and/or the second terminal 62. Any number of terminals may be connected to the first telemetry system 51 and/or the second telemetry system 52, and the present invention is not limited to a specific number of terminals.

The first terminal 61, the second terminal 62, the first telemetry system 51 and/or the second telemetry system 52 may connect to a server 70 that may be in communication with a database 75. The server 70 and/or the database 75 may be remote relative to the first terminal 61 and/or the second terminal 62. The database 75 may be accessible via a control application 80 associated with the database 75. The tools 10 may transmit the data to the database 75 and/or the control application 80 using the first telemetry system 51 and/or the second telemetry system 52. The database 75 and/or the control application may store the data and/or any other information known to one having ordinary skill in the art. The control application 80 may be provided by and/or stored by a computer readable medium, such as, for example, a compact disc, a DVD, a computer memory, a hard drive and/or the like. The computer readable medium may enable the first terminal 61 and/or the second terminal 62 to execute the control application.

The control application may enable one or more users to communicate with the first telemetry system 51, the second telemetry system 52 and/or the tools 10 using the first terminal 61 and/or the second terminal 62. For example, the control application may have a graphic user interface provided and/or displayed by a standard web browser. The control application may display the data. The signals that may be transmitted to the tools 10 from the first terminal 61 and/or the second terminal 62 may be based on user input into the control application. Users may use, may access and/or may retrieve the control application using a web browser provided by the first terminal 61 and/or the second terminal 62. The database 75 may be accessed by a single application or by multiple applications that may be linked to the database 75. The database 75, the control application, the first terminal 61 and/or the second terminal 62 may generate a report that may have and/or may be based on the data. The report may have and/or may be based on the data transmitted from the first telemetry system 51 and/or the data transmitted from the second telemetry system 52.

Each of the tools 10 may be connected to a tool bus 90. For example, the tool bus 90 may be a cable, a wire, or other communication path that may connect each of the tools 10 to each other. For example, each of the tools 10 may have a wire segment, and/or the wire segments may form the tool bus 90.

The first telemetry system 51 may have a first interface 56, and/or the second telemetry system 52 may have a second interface 57. The first interface 56 and/or the second interface 57 may be located in the borehole 30 and/or may be associated with the BHA 21. The tool bus 90 may connect to the first interface 56 and/or the second interface 57. The tools 10 may communicate with the first interface 56 and/or the second interface 57 using the tool bus 90.

The first interface 56 may transmit first data requests to one or more of the tools 10 using the tool bus 90. The tools 10 may obtain the data corresponding to the first data requests, and/or the tools 10 may transmit the data corresponding to the first data requests to the first interface 56 using the tool bus 90. The second interface 57 may transmit second data requests to one or more of the tools 10 using the tool bus 90. The tools 10 may obtain the data corresponding to the second data requests, and/or the tools 10 may transmit the data corresponding to the second data requests to the second interface 57 using the tool bus 90. The first telemetry system 51 and/or the second telemetry system 52 may transmit the data corresponding to the first data requests and/or the data corresponding to the second data requests, respectively, to the surface location 29. In an embodiment, the first interface 56 and the second interface 57 may be merged into a a single interface and may eliminate the need for the tool bus 90 and/or master-slave switching. Specifically, the single interface may automatically decide which telemetry system to activate and use or may receive a command from a surface terminal.

Control of the interfaces 56, 57 may be at the surface via transmitting commands from the surface to the interfaces 56, 57. The interfaces 56, 57 may be controlled downhole by one of the other interfaces 56, 57, one of the tools 10 and/or any other downhole component.

The tool bus 90 may be configured to transmit the data from the tools 10 to the first interface 56 and/or the second interface 57, to transmit the first data requests from the first interface 56 to the tools 10, and to transmit the second data requests from the second interface 57 to the tools 10. In an embodiment, the tool bus 90 may utilize a 250 KHz carrier frequency that may be modulated between 200 KHz and 300 KHz. The tool bus 90 may provide electrical power to the tools 10. The present invention is not limited to a specific embodiment of the tool bus 90. The tool bus 90 may be any apparatus capable of transmitting the first data requests and/or the second data requests to the tools 10 and/or transmitting the data from the tools 10.

For example, the first data requests and/or the second data requests may be based on the signals transmitted from the first telemetry system 51 and/or the second telemetry system 52. As a further example, the first interface 56 and/or the second interface 57 may transmit the first data requests and/or the second data requests, respectively, automatically and without user input. The first interface 56 and/or the second interface 57 may transmit the first data requests and/or the second data requests, respectively, at predetermined time intervals, for example.

In an embodiment, the first interface 56 and/or the second interface 57 may transmit the first data requests and the second data requests, respectively, to the tools 10 substantially simultaneously. The first telemetry system 51 and the second telemetry system 52 may transmit the data corresponding to the first data requests and the data corresponding to the second data requests, respectively, to the surface location 29 substantially simultaneously.

The tool bus 90 may execute and/or may implement a controller-area network ("CAN") protocol as known to one having ordinary skill in the art. A CAN protocol may enable multiple devices to communicate on a bus that interconnects the devices. A CAN controller connected to the bus may receive messages transmitted simultaneously from different devices and may determine a dominant message of the messages, such as, for example, by comparing identification numbers associated with the messages. The CAN controller may overwrite the other messages so that only the dominant message may be received by the devices connected to the bus. Thus, the tool bus 90 may execute and/or may implement a CAN protocol to enable transmission of the first data requests and the second data requests to the tools 10 substantially simultaneously.

The tool bus 90 may execute and/or may implement a Time Division Multiplexing ("TDM") protocol as known to one having ordinary skill in the art. A TDM protocol may enable two or more signals to be transferred substantially simultaneously as sub-channels in one communication channel. The TDM protocol may alternate transmission of the sub-channels on the communication channel. A time period of transmission may be divided into several timeslots of fixed length, and one timeslot may be associated with each sub-channel. One TDM frame may have one timeslot per sub-channel. Thus, the tool bus 90 may execute and/or may implement a TDM protocol to enable transmission of the first data requests and the second data requests to the tools 10 substantially simultaneously.

Transmittal and/or processing of the first data requests may interfere with transmittal and/or processing of the second data requests, and/or the transmittal and/or the processing of the second data requests may interfere with the transmittal and/or the processing of the first data requests. Further, transmittal and/or processing of the data corresponding to the first data requests may interfere with transmittal and/or processing of the data corresponding to the second data requests, and/or the transmittal and/or the processing of the data corresponding to the second data requests may interfere with the transmittal and/or the processing of the data corresponding to the first data requests.

Therefore, in an embodiment of the present invention, the first telemetry system 51 may be configured to be a "master" and/or the second telemetry system 52 may be configured to be a "slave." Configuration of the first telemetry system 51 as the "master" and/or the second telemetry system 52 as the "slave" may be a default setting for the drilling system 1. A command transmitted from the first terminal 61 and/or the second terminal 62 may establish the configuration of the first telemetry system 51 as the "master" and/or the second telemetry system 52 as the "slave." For example, the signals transmitted from the first terminal 61 and/or the second terminal 62 may have the command. The configuration of the first telemetry system 51 as the "master" and/or the second telemetry system 52 as the "slave" may be based on transmission capabilities of the first telemetry system 51 and/or transmission capabilities of the second telemetry system 52. The present invention is not limited to a specific means for establishing the configuration of the first telemetry system 51 as the "master" and/or the second telemetry system 52 as the "slave."

The first telemetry system 51 may operate as the "master" by transmitting the first data requests from the first interface 56 to the tools 10 using the tool bus 90. In response to the first data requests, the tools 10 may obtain the data corresponding to the first data requests and/or may transmit the data corresponding to the first data requests to the first interface 56 using the tool bus 90. The first interface 56 may transmit the data corresponding to the first data requests to the surface location 29 using the first telemetry system 51.

The second telemetry system 52 may operate as the "slave" by not transmitting the second data requests to the tool bus 90 and/or the tools 10. The second telemetry system 52 may monitor the tool bus 90 so that the data transmitted from the tools 10 to the first interface 56 may be accessible to the second interface 57. For example, the second interface 57 may use the tool bus 90 to access the data corresponding to the first data requests. The second interface 57 may access the data corresponding to the first data requests so that the second telemetry system 52 may obtain the data corresponding to the first data requests. The second telemetry system 52 may transmit the data and/or a selected portion of the data to the surface location 29. The selected portion of the data may be based on the transmission capabilities of the first telemetry system and/or the transmission capabilities of the second telemetry system 52.

If the first telemetry system 51 becomes unavailable and/or nonfunctional, the second telemetry system 52 may become the "master" and/or the first telemetry system 51 may become the "slave" as discussed in further detail hereafter. For example, the first telemetry system 51 may be unavailable and/or nonfunctional because of an interruption in transmission of the data by the first telemetry system 51 may cause.

The drilling system 1 may determine that the first telemetry system 51 may be unavailable and/or nonfunctional. For example, the drilling system 1 may determine that transmission of the data by the first telemetry system 51 may be interrupted. The first interface 56 may transmit a status message that may indicate that the first telemetry system 51 may be unavailable and/or nonfunctional. The second telemetry system 52 may receive the status message that may indicate that the first telemetry system 51 may be unavailable and/or nonfunctional. In response to determination that the first telemetry system 51 may be unavailable and/or nonfunctional, the drilling system 1 may direct the second telemetry system 52 to be the "master" and/or the first telemetry system 51 to be the "slave." The drilling system 1 may determine that the first telemetry system 51 may be unavailable and/or nonfunctional, may direct the second telemetry system 52 to be the "master" and/or may direct the first telemetry system 51 to be the "slave" automatically and/or without user input. For example, the drilling system 1 may determine that the first telemetry system 51 may be unavailable and/or nonfunctional, may direct the second telemetry system 52 to be the "master" and/or may direct the first telemetry system 51 to be the "slave" using a processor (not shown). The processor may be located in the borehole 30, at the surface location 29 and/or remote to the drill string 14.

The second telemetry system 52 may become the "master" and/or the first telemetry system 51 may become the "slave" in response to a command that may be initiated at the surface location 29. For example, the first terminal 61 and/or the second terminal 62 may transmit the command. For example, the signals transmitted from the first terminal 61 and/or the second terminal 62 may have the command. The command may be based on user input. The command may not be based on user input; for example, the first terminal 61 and/or the second terminal 62 may transmit the command in response to receipt and/or analysis of the data.

The drilling system 1 may determine that the first telemetry system 51 may be unavailable and/or nonfunctional using a "ping" message. As known to one having ordinary skill in the art, a "ping" message may be a message that requests a device for a response. The message may have data and/or may request that the device encode the response to have data substantially similar to the data of the packet. The response may indicate availability and/or functionality of the device. The "ping" message and the response may be used to determine a time delay. The time delay may be the difference between the time the response was received relative to the time the "ping" message was sent. The delay may be used to determine the availability and/or the functionality of the device. Further, delays associated with "ping" messages may be monitored and/or stored. Comparison of the delay to the delays associated with previous "ping" messages may be used to determine the availability and/or the functionality of the device. Moreover, comparison of the data encoded by the response relative to the data encoded by the "ping" message may be used to determine the availability and/or the functionality of the device.

The "ping" message that may be transmitted to the first interface 56 and/or the second interface 57. The response to the "ping" message may indicate the availability and/or functionality of the first telemetry system 51 and/or the second telemetry system 52. For example, the first terminal 61, the second terminal 62 and/or the second interface 57 may transmit the "ping" message to the first interface 56. The first interface 56 may transmit the response to the first terminal 61, the second terminal 62 and/or the second interface 57. As a further example, the first terminal 61, the second terminal 62 and/or the first interface 56 may transmit the "ping" message to the second interface 57. The second interface 57 may transmit the response to the first terminal 61, the second terminal 62 and/or the first interface 56. The response may indicate the availability and/or the functionality of the first telemetry system 51 and/or the second telemetry system 52. The present invention is not limited to a specific embodiment of the "ping" message or the response. The "ping" message and the response may be any messages that indicate the availability and/or the functionality of the first telemetry system 51 and/or the second telemetry system 52.

Firmware that may be executed by the first interface 56 and/or the second interface 57 may determine the availability and/or the functionality of the first telemetry system 51 and/or the second telemetry system 52. As known to one having ordinary skill in the art, the firmware may be fixed programs that may be relatively small in size and/or that may control a device that executes the firmware. The firmware that may be executed by the first interface 56 may communicate with the firmware that may be executed by the second interface 57. The firmware that may be executed by the first interface 56 may indicate the availability and/or the functionality of the first telemetry system 51 to the firmware that may be executed by the second interface 57. The present invention is not limited to a specific embodiment of the firmware, and the firmware may be any program or programs capable of communication regarding the availability and/or the functionality of the first telemetry system 51 and/or the second telemetry system 52 known to one having ordinary skill in the art.

If the first telemetry system 51 may be unavailable and/or nonfunctional, the second telemetry system 52 may operate as the "master" by transmitting the second data requests from the second interface 57 to the tools 10 using the tool bus 90. In response to the second data requests, the tools 10 may obtain the data corresponding to the second data requests and/or may transmit the data corresponding to the second data requests to the second interface 57 using the tool bus 90. The second interface 57 may transmit the data corresponding to the second data requests to the surface location 29 using the second telemetry system 52. If the first telemetry system 51 may be unavailable and/or nonfunctional, the first telemetry system 51 may operate as the "slave" by not transmitting the first data requests to the tool bus 90 and/or the tools 10.

A subsequent "ping" message and/or the firmware may indicate that the first telemetry system 51 may have regained the availability and/or the functionality. If the first telemetry system 51 may have regained the availability and/or the functionality, the second telemetry system 52 may return to being the "slave," and/or the first telemetry system 51 may return to being the "master." If the first telemetry system 51 may have regained the availability and/or the functionality, the first telemetry system 51 may return to being the "master" by transmitting the first data requests from the first interface 56 to the tools 10 using the tool bus 90. In response to the first data requests, the tools 10 may obtain the data corresponding to the first data requests and/or may transmit the data corresponding to the first data requests to the first interface 56 using the tool bus 90. If the first telemetry system 51 may have regained the availability and/or the functionality, the first interface 56 may transmit the data corresponding to the first data requests to the surface location 29 using the first telemetry system 51. If the first telemetry system 51 may have regained the availability and/or the functionality, the second telemetry system 52 may return to being the "slave" by not transmitting the second data requests to the tool bus 90 and/or the tools 10.

While the present embodiments are described in relation to data requests, it will be appreciated by a person having ordinary skill in the art that the data may be transmitted automatically by the tools 10 without requests. For example, the tools 10 may be preprogrammed to transmit data without requests. In addition, the tools 10 may receive a single control signal, which may be considered a data request, that instructs one or more of the tools 10 which data to acquire, which data to transmit, when to transmit the data, and a priority of the data.

In another embodiment of the present invention, the first telemetry system 51 and the second telemetry system 52 may be configured to be the "master." The first telemetry system 51 may operate as the "master" during a first time period by transmitting the first data requests from the first interface 56 to the tools 10 using the tool bus 90. The first time period may be a predetermined time and/or may be controlled from one of the terminals 61, 62 or other surface component. In response to the first data requests, the tools 10 may obtain the data corresponding to the first data requests and/or may transmit the data corresponding to the first data requests to the first interface 56 using the tool bus 90. During the first time period, the first interface 56 may transmit the data corresponding to the first data requests to the surface location 29 using the first telemetry system 51. During the first time period, the second telemetry system 52 may operate as the "slave" by not transmitting the second data requests to the tool bus 90 and/or the tools 10.

During a second time period that may be a different time period than the first time period, the second telemetry system 52 may operate as the "master" by transmitting the second data requests from the second interface 57 to the tools 10 using the tool bus 90. In response to the second data requests, the tools 10 may obtain the data corresponding to the second data requests and/or may transmit the data corresponding to the second data requests to the second interface 57 using the tool bus 90. During the second time period, the second interface 57 may transmit the data corresponding to the second data requests to the surface location 29 using the second telemetry system 52. During the second time period, the first telemetry system 51 may operate as the "slave" by not transmitting the first data requests to the tool bus 90 and/or the tools 10.

Thus, the first telemetry system 51 and the second telemetry system 52 may continuously alternate functioning as the "master." The first time period and the second time period may occur in a cycle. For example, the second time period may occur after the first time period, and then the cycle may be repeated. For example, the first telemetry system 51 may operate as the "master" by transmitting the first data requests during the first time period, and/or the second telemetry system 52 may operate as the "slave" by not transmitting the second data requests during the first time period. Then, the second telemetry system 52 may be the "master" by transmitting the second data requests during the second time period, and/or the first telemetry system 51 may be the "slave" by not transmitting the first data requests during the second time period. Then, the cycle may repeat by re-initiating the first time period.

As a further example, the first interface 56 may indicate to the second interface 57 that the first data requests were answered and/or may indicate that the second telemetry system 52 may become the "master." In response, the second telemetry system 52 may operate as the "master," and/or the first telemetry system 51 may operate as the "slave." The second interface 57 may indicate to the first interface 56 that the second data requests were answered and/or may indicate that the first telemetry system 52 may become the "master." In response, the first telemetry system 51 may return to being the "master," and/or the second telemetry system 52 may return to being the "slave." For example, a specific telemetry system may indicate to the other telemetry system that the other telemetry system may become the "master" using a message transmitted using the tool bus 90.

In another embodiment of the present invention, the data may be obtained and/or may be transmitted by the first telemetry system 51 and/or the second telemetry system 52 based on whether the first terminal 61 and/or the second terminal 62 may access the first telemetry system 51 and/or the second telemetry system 52. For example, the first terminal 61 may be connected to both the first telemetry system 51 and/or the second telemetry system 52.

One of the tools 10 may be a telemetry control unit that may control whether the first interface 56 and/or the second interface 57 may transmit the first data requests and/or the second data requests, respectively. The telemetry control unit may be connected to the first interface 56, the second interface 57 and/or the tool bus 90. The telemetry control unit may be located within the borehole 30. The telemetry control unit may control whether the data is transmitted from the tools 10 to the first interface 56 and/or the second interface 57. The telemetry control unit may determine whether the data is transmitted from the tools 10 to the first interface 56 and/or the second interface 57 based on whether the first terminal 61 may access the first telemetry system 51, the first interface 56, the second telemetry control unit 52 and/or the second interface 57. If the first interface 56 transmits the first data requests, the telemetry control unit may prevent the second interface 57 from transmitting the second data requests. If the second interface 57 transmits the second data requests, the telemetry control unit may prevent the first interface 56 from transmitting the first data requests.

For example, if the first terminal 61 may access the first telemetry system 51 and/or the first interface 56, the telemetry control unit may enable the first interface 56 to transmit the first data requests to the tools 10. The telemetry control unit may enable the tools 10 to transmit the data corresponding to the first data requests to the first interface 56. The first telemetry system 51 may transmit the data to the first terminal 61. As a further example, if the first terminal 61 may access the second telemetry system 52 and/or the second interface 57, the telemetry control unit may enable the second interface 57 to transmit the second data requests to the tools 10. The telemetry control unit may enable the tools 10 to transmit the data corresponding to the second data requests to the second interface 57. The second telemetry system 52 may transmit the data to the first terminal 61.

Figure 3:
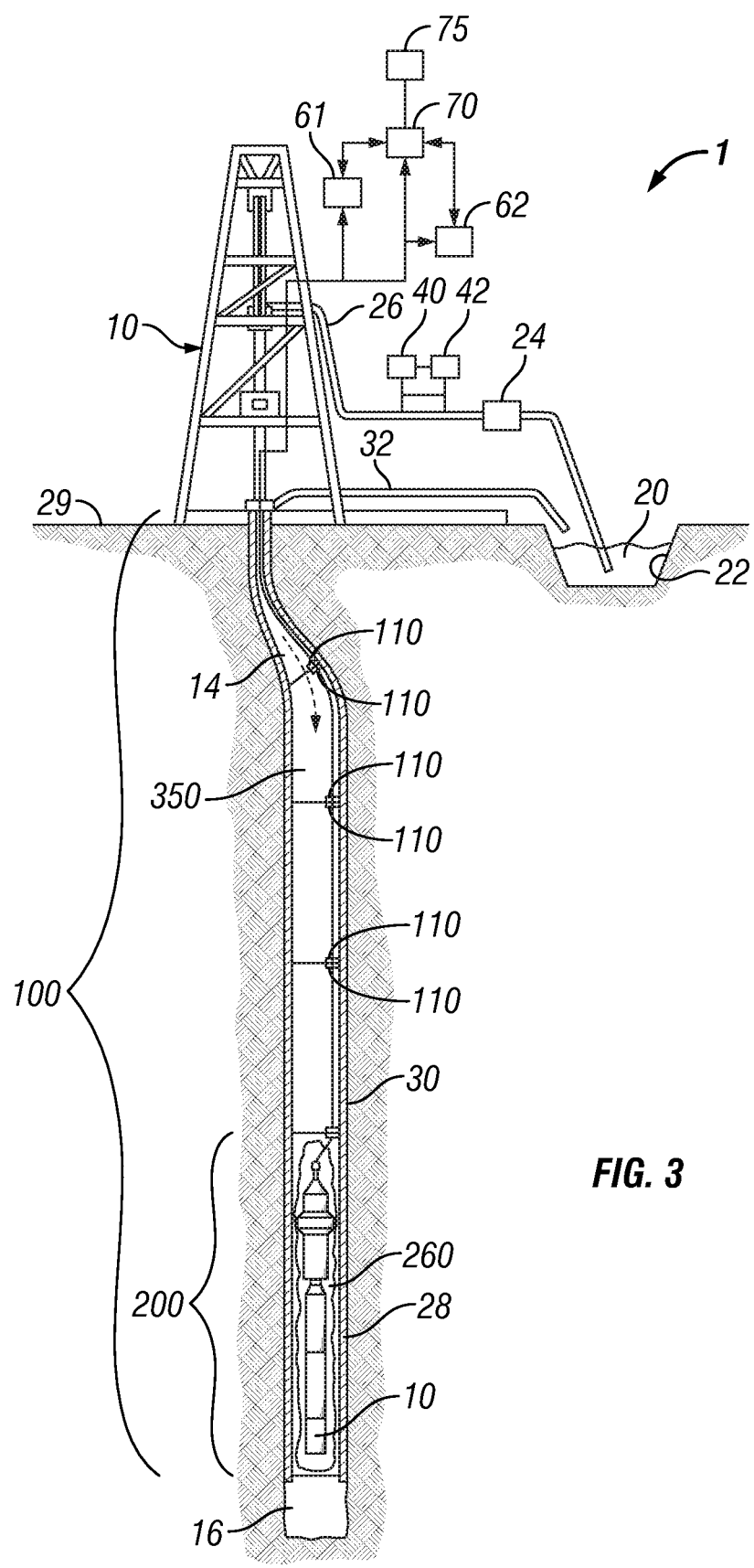
FIG. 3 illustrates a drill string in an embodiment of the present invention.

FIG. 3 depicts an embodiment of the drilling system 1. The drilling system 1 may have wired drill pipe 100 that may consist of one or more wired drill pipe joints 110 (hereafter "the WDP joints 110"). The WDP joints 110 may be interconnected to form the drill string 14. The wired drill pipe 100 and/or the WDP joints 110 may transmit the data from the tools 10 to the surface location 29, the first terminal 61 and/or the second terminal 62. An example of a WDP joint that may be used in the wired drill pipe 100 is described in detail in U.S. Pat. No. 6,641,434 to Boyle et al., herein incorporated by reference in its entirety. The present invention is not limited to a specific embodiment of the wired drill pipe 100 and/or the WDP joints 110. The wired drill pipe 100 may be any system that may receive the data from the tools 10 and may transmit the data to the surface location 29 as known to one having ordinary skill in the art.

A wired drill pipe interface sub 160 (hereafter "the WDP interface 160") may connect the tool bus 90 and/or the tools 10 to the wired drill pipe 100. The WDP interface 160 may operate as an interface between the wired drill pipe 100 and the tool bus 90 and/or the tools 10. The WDP interface 160 may receive the data from the tools 10 using the tool bus 90. The WDP interface 160 may transmit the data from the tool bus 90 and/or the tools 10 to the surface location 29 using the WDP joints 110. The WDP interface 160 may be located in the borehole 30 and/or may be associated with the BHA 21. The present invention is not limited to a specific embodiment of the WDP interface 160.

The drill string 14 may have a mud pulse telemetry system 200. The mud pulse telemetry system 200 may have a Measurement-While-Drilling module 260 (hereafter "MWD module 260") that may be located in the borehole 30 and/or may be associated with the BHA 21. The mud pulse telemetry system 200 and/or the MWD module 260 may control flow of the drilling fluid 20 through the drill string 14. By controlling the flow of the drilling fluid 20, the MWD module 260 may cause pressure changes in the drilling fluid 20 located in the drill string 14 and/or the first fluid line 26. The pressure changes in the first fluid line 26 may be detected by a sensor 40 which may be connected to a processor 42. The pressure changes in the drilling fluid 20 may be indicative of the data, and/or the processor 42 may obtain the data based on the pressure changes in the drilling fluid 20.

An example of a mud pulse telemetry system 200 that may be used in the present invention is described in detail in U.S. Pat. No. 5,375,098 to Malone et al., herein incorporated by reference in its entirety. The present invention is not limited to a specific embodiment of the mud pulse telemetry system 200 and/or the MWD module 260. The mud pulse telemetry system 200 may be any system that may receive the data from the tools 10 and may use the drilling fluid 20 to transmit the data to the surface location 29 as known to one having ordinary skill in the art.

The MWD module 260 may generate electrical power for the drill string 14. For example, the MWD module 260 may have a turbine generator (not shown) powered by the flow of the drilling fluid 20. The MWD module 260 may receive the data from the tool bus 90 and/or the tools 10. The MWD module 260 may transmit the data from the tool bus 90 and/or the tools 10 to the surface location 29 by causing the pressure changes in the drilling fluid 20.

The MWD module 260 may obtain and/or may generate MWD data. The MWD data may be a portion of the data acquired from and/or through the borehole 30. For example, the MWD data may be and/or may indicate a direction, an inclination, a resistivity, a density, a porosity and/or the like. The present invention is not limited to a specific embodiment of the MWD data.

The first terminal 61 and/or the second terminal 62 may be connected to the wired drill pipe 100 and/or the mud pulse telemetry system 200. The wired drill pipe 100 and/or the mud pulse telemetry system 200 may transmit the data from the tool bus 90 and/or the tools 10 to the first terminal 61, the second terminal 62, the server 70, the database 75 and/or the control application 80.

The WDP interface 160 and/or the MWD module 260 may be located in the borehole 30 and/or adjacent to the BHA 21. The tool bus 90 may connect the tools 10 to the WDP interface 160 and/or the MWD module 260. The WDP interface 160 may transmit the first data requests to one or more of the tools 10 using the tool bus 90. The tools 10 may obtain the data corresponding to the first data requests, and/or the tools 10 may transmit the data corresponding to the first data requests to the WDP interface 160 using the tool bus 90. The MWD module 260 may transmit the second data requests to one or more of the tools 10 using the tool bus 90. The tools 10 may obtain the data corresponding to the second data requests, and/or the tools 10 may transmit the data corresponding to the second data requests to the MWD module 260 using the tool bus 90. The wired drill pipe 100 and/or the mud pulse telemetry system 200 may transmit the data corresponding to the first data requests and/or the data corresponding to the second data requests, respectively, to the surface location 29. In an embodiment of the present invention, the wired drill pipe 100 and/or the mud pulse telemetry system 200 may transmit the first data requests and the second data requests, respectively, to the tools 10 substantially simultaneously. The wired drill pipe 100 and/or the mud pulse telemetry system 200 may transmit the data corresponding to the first data requests and the data corresponding to the second data requests, respectively, to the surface location 29 substantially simultaneously.

As discussed previously, the transmittal and/or the processing of the first data requests may interfere with the transmittal and/or the processing of the second data requests, and/or the transmittal and/or the processing of the second data requests may interfere with the transmittal and/or the processing of the first data requests. Further, the transmittal and/or the processing of the data corresponding to the first data requests may interfere with transmittal and/or processing of the data corresponding to the second data requests, and/or the transmittal and/or the processing of the data corresponding to the second data requests may interfere with the transmittal and/or the processing of the data corresponding to the first data requests.

Therefore, in an embodiment of the present invention, the wired drill pipe 100 may be configured to be the "master" and/or the mud pulse telemetry system 200 may be configured to be a "slave." Configuration of the wired drill pipe 100 as the "master" and/or the mud pulse telemetry system 200 as the "slave" may be a default setting for the drilling system 1. A command transmitted from the first terminal 61 and/or the second terminal 62 may establish the configuration of the wired drill pipe 100 as the "master" and/or the mud pulse telemetry system 200 as the "slave." For example, the signals transmitted from the first terminal 61 and/or the second terminal 62 may have the command. The configuration of the wired drill pipe 100 as the "master" and/or the mud pulse telemetry system 200 as the "slave" may be based on transmission capabilities of the wired drill pipe 100 and/or transmission capabilities of the mud pulse telemetry system 200. The present invention is not limited to a specific means for establishing the configuration of the wired drill pipe 100 as the "master" and/or the mud pulse telemetry system 200 as the "slave."

The wired drill pipe 100 may operate as the "master" by transmitting the first data requests from the WDP interface 160 to the tools 10 using the tool bus 90. In response to the first data requests, the tools 10 may obtain the data corresponding to the first data requests and/or may transmit the data corresponding to the first data requests to the WDP interface 160 using the tool bus 90. The WDP interface 160 may transmit the data corresponding to the first data requests to the surface location 29 using the wired drill pipe 100.

The mud pulse telemetry system 200 may operate as the "slave" by not transmitting the second data requests to the tool bus 90 and/or the tools 10. The mud pulse telemetry system 200 may monitor the tool bus 90 so that the data transmitted from the tools 10 to the WDP interface 160 may be accessible to the MWD module 260. For example, the MWD module 260 may use the tool bus 90 to access the data corresponding to the first data requests. The MWD module 260 may access the data transmitted from the tools 10 to the WDP interface 160 so that the mud pulse telemetry system 200 may obtain the data corresponding to the first data requests. The mud pulse telemetry system 200 may transmit the data and/or a selected portion of the data to the surface location 29. For example, the selected portion may correspond to the MWD data. The selected portion of the data may be based on the transmission capabilities of the mud pulse telemetry system 200 and/or the transmission capabilities of the wired drill pipe 100.

The wired drill pipe 100 may operate as the "master" by treating the MWD module 260 as one of the tools 10. For example, the wired drill pipe 100 may operate as the "master" by controlling operation of the MWD module 260. For example, the wired drill pipe 100 may operate as the "master" by modifying operating parameters of the MWD module 260, by changing an operating mode of the MWD module 260, by requesting, receiving and/or processing the data obtained by the MWD module 260 and/or the like. For example, the WDP interface 160 may request the MWD data from the MWD module 260. The MWD module 260 may obtain the MWD data and/or may transmit the MWD data to the WDP interface 160 using the tool bus 90. For example, the WDP interface 160 may transmit the first data requests to the MWD module 260, and/or the MWD module may transmit the MWD data to the WDP interface 160 in response to the first data requests.

If the wired drill pipe 100 becomes unavailable and/or nonfunctional, the mud pulse telemetry system 200 may become the "master" and/or the wired drill pipe 100 may become the "slave." For example, the wired drill pipe 100 may be unavailable and/or may be nonfunctional because of an interruption in transmission of the data by the wired drill pipe 100. For example, adjacent WDP joints 110 may become separated which may cause the interruption in the transmission of the data.

The drilling system 1 may determine that the wired drill pipe 100 may be unavailable and/or nonfunctional. For example, the drilling system 1 may detect the interruption in the transmission of the data by the wired drill pipe 100. As a further example, the WDP interface 160 may transmit a status message that may indicate that the wired drill pipe 100 may be unavailable and/or nonfunctional. The mud pulse telemetry system 200 may receive the status message that may indicate that the wired drill pipe 100 may be unavailable and/or nonfunctional. In response to determination that the wired drill pipe 100 may be unavailable and/or nonfunctional, the drilling system 1 may direct the mud pulse telemetry system 200 to be the "master" and/or the wired drill pipe 100 to be the "slave." The drilling system 1 may determine that the wired drill pipe 100 may be unavailable and/or nonfunctional, may direct the mud pulse telemetry system 200 to be the "master" and/or may direct the wired drill pipe 100 to be the "slave" automatically and/or without user input.

The mud pulse telemetry system 200 may become the "master" and/or the wired drill pipe 100 may become the "slave" in response to a command that may be initiated at the surface location 29. For example, the signals transmitted from the first terminal 61 and/or the second terminal 62 may have the command. The command may be based on user input. The command may not be based on user input; for example, the first terminal 61 and/or the second terminal 62 may transmit the command in response to receipt and/or analysis of the data.

The drilling system 1 may determine that the wired drill pipe 100 may be unavailable and/or nonfunctional using the "ping" message as known to one having ordinary skill in the art. The "ping" message may be transmitted to the WDP interface 160. The response to the "ping" message may indicate the availability and/or functionality of the wired drill pipe 100. For example, the first terminal 61, the second terminal 62 and/or the MWD module 260 may transmit the "ping" message to the WDP interface 160. The WDP interface 160 may transmit the response to the first terminal 61, the second terminal 62 and/or the MWD module 260. The response to the "ping" message may indicate the availability and/or the functionality of the wired drill pipe 100. The "ping" message and the response may be any message that indicates the availability and/or the functionality of the wired drill pipe 100.

Firmware that may be executed by the WDP interface 160 and/or the MWD module 260 may determine the availability and/or the functionality of the wired drill pipe 100 as known to one having ordinary skill in the art. The firmware that may be executed by the WDP interface 160 may communicate with the firmware that may be executed by the MWD module 260. The firmware that may be executed by the WDP interface 160 may indicate the availability and/or the functionality of the wired drill pipe 100 to the firmware that may be executed by the MWD module 260. The firmware may be any programs capable of communication regarding the availability and/or the functionality of the wired drill pipe 100 known to one having ordinary skill in the art.

If the wired drill pipe 100 may be unavailable and/or nonfunctional, the mud pulse telemetry system 200 may operate as the "master" by transmitting the second data requests from the MWD module 260 to the tools 10 using the tool bus 90. In response to the second data requests, the tools 10 may obtain the data corresponding to the second data requests and/or may transmit the data corresponding to the second data requests to the MWD module 260 using the tool bus 90. The MWD module 260 may transmit the data corresponding to the second data requests to the surface location 29 using the mud pulse telemetry system 200. If the wired drill pipe 100 may be unavailable and/or nonfunctional, the wired drill pipe 100 may operate as the "slave" by not transmitting the first data requests to the tool bus 90 and/or the tools 10.

A subsequent "ping" message and/or the firmware may indicate that the wired drill pipe 100 may have regained the availability and/or the functionality. If the wired drill pipe 100 may have regained the availability and/or the functionality, the mud pulse telemetry system 200 may return to being the "slave," and/or the wired drill pipe 100 may return to being the "master." If the wired drill pipe 100 may have regained the availability and/or the functionality, the wired drill pipe 100 may return to being the "master" by transmitting the first data requests from the WDP interface 160 to the tools 10. In response to the first data requests, the tools 10 may obtain the data corresponding to the first data requests and/or may transmit the data corresponding to the first data requests to the WDP interface 160 using the tool bus 90. If the wired drill pipe 100 may have regained the availability and/or the functionality, the WDP interface 160 may transmit the data corresponding to the first data requests to the surface location 29 using the wired drill pipe 100. If the wired drill pipe 100 may have regained the availability and/or the functionality, the mud pulse telemetry system 200 may return to being the "slave" by not transmitting the second data requests to the tool bus 90 and/or the tools 10.

In another embodiment of the present invention, the wired drill pipe 100 may be configured to be the "slave" and/or the mud pulse telemetry system 200 may be configured to be the "master." Configuration of the wired drill pipe 100 as the "slave" and/or the mud pulse telemetry system 200 as the "master" may be a default setting for the drilling system 1. A command transmitted from the first terminal 61 and/or the second terminal 62 may establish the configuration of the wired drill pipe 100 as the "slave" and/or the mud pulse telemetry system 200 as the "master." For example, the signals transmitted from the first terminal 61 and/or the second terminal 62 may have the command. The configuration of the wired drill pipe 100 as the "slave" and/or the mud pulse telemetry system 200 as the "master" may be based on the transmission capabilities of the wired drill pipe 100 and/or the transmission capabilities of the mud pulse telemetry system 200. The present invention is not limited to a specific means for establishing the configuration of the wired drill pipe 100 as the "slave" and/or the mud pulse telemetry system 200 as the "master."

The mud pulse telemetry system 200 may operate as the "master" by transmitting the second data requests from the MWD module 260 to the tools 10 using the tool bus 90. In response to the second data requests, the tools 10 may obtain the data corresponding to the second data requests and/or may transmit the data corresponding to the second data requests to the MWD module 260 using the tool bus 90. The MWD module 260 may transmit the data corresponding to the second data requests to the surface location 29 using the mud pulse telemetry system 200.

The wired drill pipe 100 may operate as the "slave" by not transmitting the first data requests to the tool bus 90 and/or the tools 10. The wired drill pipe 100 may monitor the tool bus 90 so that the data transmitted from the tools 10 to the MWD module 260 may be accessible to the WDP interface 160. For example, the WDP interface 160 may use the tool bus 90 to access the data corresponding to the second data requests. The WDP interface 160 may access the data corresponding to the second data requests so that the wired drill pipe 100 may obtain the data corresponding to the second data requests. The wired drill pipe 100 may transmit the data and/or a selected portion of the data to the surface location 29. The selected portion of the data may be based on the transmission capabilities of the wired drill pipe 100 and/or the transmission capabilities of the mud pulse telemetry system 200.

If the mud pulse telemetry system 200 may become unavailable and/or nonfunctional, the wired drill pipe 100 may become the "master." For example, the mud pulse telemetry system 200 may have interruption in the transmission of the data if the MWD module 260 ceases to transmit the data using the pressure changes in the drilling fluid 20. For example, the MWD module 260 may cease generation of the pressure changes if the drilling fluid 20 has a foaming agent, such as, for example, a compressible gas injected into the drilling fluid 20. As a further example, the MWD module 260 may cease to transmit the data using the pressure changes if a depth of the borehole 30 weakens an amplitude of the pressure changes.

The drilling system 1 may determine that the mud pulse telemetry system 200 may be unavailable and/or nonfunctional. For example, the drilling system 1 may detect the interruption in the transmission of the data by the mud pulse telemetry system 200. As a further example, the MWD module 260 may transmit a status message that may indicate that the mud pulse telemetry system 200 may be unavailable and/or nonfunctional. The wired drill pipe 100 may receive the status message that may indicate that the mud pulse telemetry system 200 may be unavailable and/or nonfunctional. In response to a determination that the mud pulse telemetry system 200 may be unavailable and/or nonfunctional, the drilling system 1 may direct the mud pulse telemetry system 200 to be the "slave" and/or the wired drill pipe 100 to be the "master." The drilling system 1 may determine that the mud pulse telemetry system 200 may be unavailable and/or nonfunctional, may direct the mud pulse telemetry system 200 to be the "slave" and/or may direct the wired drill pipe 100 to be the "master" automatically and/or without user input.

The mud pulse telemetry system 200 may become the "slave" and/or the wired drill pipe 100 may become the "master" in response to a command that may be initiated at the surface location 29. For example, the signals transmitted from the first terminal 61 and/or the second terminal 62 may have the command. The command may be based on user input. Alternatively, the command may not be based on user input; for example, the first terminal 61 and/or the second terminal 62 may automatically generate the command in response to receipt and/or analysis of the data.

The drilling system 1 may determine that the mud pulse telemetry system 200 may be unavailable and/or nonfunctional using the "ping" message as known to one having ordinary skill in the art. The "ping" message may be transmitted to the MWD module 260. The response to the "ping" message may indicate the availability and/or functionality of the mud pulse telemetry system 200. For example, the first terminal 61, the second terminal 62 and/or the WDP interface 160 may transmit the "ping" message to the MWD module 260. The MWD module 260 may transmit the response to the first terminal 61, the second terminal 62 and/or the WDP interface 160. The response to the "ping" message may indicate the availability and/or the functionality of the mud pulse telemetry system 200. The "ping" message and the response may be any messages that indicate the availability and/or the functionality of the mud pulse telemetry system 200.

Firmware that may be executed by the WDP interface 160 and/or the MWD module 260 may determine the availability and/or the functionality of the mud pulse telemetry system 200 as known to one having ordinary skill in the art. The firmware that may be executed by the WDP interface 160 may communicate with the firmware that may be executed by the MWD module 260. The firmware that may be executed by the MWD module 260 may indicate the availability and/or the functionality of the mud pulse telemetry system 200 to the firmware that may be executed by the WDP interface 160. The firmware may be any programs capable of communication regarding the availability and/or the functionality of the mud pulse telemetry system 200 known to one having ordinary skill in the art.

If the mud pulse telemetry system 200 may be unavailable and/or nonfunctional, the wired drill pipe 100 may operate as the "master" by transmitting the first data requests from the WDP interface 160 to the tools 10 using the tool bus 90. In response to the first data requests, the tools 10 may obtain the data corresponding to the first data requests and/or may transmit the data corresponding to the first data requests to the WDP interface 160 using the tool bus 90. The WDP interface 160 may transmit the data corresponding to the first data requests to the surface location 29 using the wired drill pipe 100. If the mud pulse telemetry system 200 may be unavailable and/or nonfunctional, the mud pulse telemetry system 200 may operate as the "slave" by not transmitting the second data requests to the tool bus 90 and/or the tools 10. If the mud pulse telemetry system 200 may be unavailable and/or nonfunctional, the mud pulse telemetry system 200 may operate as the "slave" by transmitting the MWD data to the WDP interface 160 using the tool sub 90.

A subsequent "ping" message and/or the firmware may indicate that the mud pulse telemetry system 200 may have regained the availability and/or the functionality. If the mud pulse telemetry system 200 may have regained the availability and/or the functionality, the mud pulse telemetry system 200 may return to being the "master," and/or the wired drill pipe 100 may return to being the "slave." If the mud pulse telemetry system 200 may have regained the availability and/or the functionality, the mud pulse telemetry system 200 may return to being the "master" by transmitting the second data requests from the MWD module 260 to the tools 10. In response to the second data requests, the tools 10 may obtain the data corresponding to the second data requests and/or may transmit the data corresponding to the second data requests to the MWD module 260 using the tool bus 90. If the mud pulse telemetry system 200 may have regained the availability and/or the functionality, the MWD module 260 may transmit the data corresponding to the second data requests to the surface location 29 using the mud pulse telemetry system 200. If the mud pulse telemetry system 200 may have regained the availability and/or the functionality, the wired drill pipe 100 may return to being the "slave" by not transmitting the first data requests to the tool bus 90 and/or the tools 10.

In another embodiment of the present invention, both of the wired drill pipe 100 and the mud pulse telemetry system 200 may be configured to be the "master." The wired drill pipe 100 may operate as the "master" during a first time period by transmitting the first data requests from the WDP interface 160 to the tools 10. In response to the first data requests, the tools 10 may obtain the data corresponding to the first data requests and/or may transmit the data corresponding to the first data requests to the WDP interface 160. During the first time period, the WDP interface 160 may transmit the data corresponding to the first data requests to the surface location 29 using the wired drill pipe 100. During the first time period, the mud pulse telemetry system 200 may operate as the "slave" by not transmitting the second data requests to the tool bus 90 and/or the tools 10.

During a second time period that may be a different time period than the first time period, the mud pulse telemetry system 200 may operate as the "master" by transmitting the second data requests from the MWD module 260 to the tools 10. In response to the second data requests, the tools 10 may obtain the data corresponding to the second data requests and/or may transmit the data corresponding to the second data requests to the MWD module 260. During the second time period, the MWD module 260 may transmit the data corresponding to the second data requests to the surface location 29 using the mud pulse telemetry system 200. During the second time period, the wired drill pipe 100 may operate as the "slave" by not transmitting the first data requests to the tool bus 90 and/or the tools 10.

Thus, the wired drill pipe 100 and the mud pulse telemetry system 200 may continuously alternate function as the "master." The first time period and the second time period may occur in a cycle. For example, the second time period may occur after the first time period, and then the cycle may be repeated. For example, the wired drill pipe 100 may operate as the "master" during the first time period by transmitting the first data requests, and/or the mud pulse telemetry system 200 may operate as the "slave" during the first time period by not transmitting the second data requests. Then, the mud pulse telemetry system 200 may operate as the "master" during the second time period by transmitting the second data requests, and/or the wired drill pipe 100 may operate as the "slave" during the second time period by not transmitting the first data requests. Then, the cycle may repeat by initiating the first time period.

As a further example, the WDP interface 160 may indicate to the MWD module 260 that the first data requests were answered, the first time period was completed and/or the mud pulse telemetry system 200 may become the "master." In response, the mud pulse telemetry system 200 may operate as the "master," and/or the wired drill pipe 100 may operate as the "slave." Then, the MWD module 260 may indicate to the WDP interface 160 that the second data requests were answered, the second time period was completed and/or the first telemetry system 52 may become the "master." In response, the wired drill pipe 100 may return to being the "master," and/or the mud pulse telemetry system 200 may return to being the "slave."

In another embodiment of the present invention, the data may be obtained and/or may be transmitted by the wired drill pipe 100 and/or the mud pulse telemetry system 200 based on whether the first terminal 61 and/or the second terminal 62 may access the wired drill pipe 100 and/or the mud pulse telemetry system 200. For example, the first terminal 61 may be connected to both the wired drill pipe 100 and/or the mud pulse telemetry system 200. One of the tools 10 that may be the telemetry control unit may control whether the WDP interface 160 and/or the MWD module 260 may transmit the first data requests and/or the second data requests, respectively. The telemetry control unit may be connected to the WDP interface 160, the MWD module 260 and/or the tool bus 90. The telemetry control unit may control whether the data may be transmitted from the tools 10 to the WDP interface 160 and/or the MWD module 260. The telemetry control unit may determine whether the data may be transmitted from the tools 10 to the WDP interface 160 and/or the MWD module 260 based on whether the first terminal 61 may access the wired drill pipe 100, the WDP interface 160, the mud pulse telemetry system 200 and/or the MWD module 260.

For example, if the first terminal 61 may access the wired drill pipe 100 and/or the WDP interface 160, the telemetry control unit may enable the WDP interface 160 to transmit the first data requests to the tools 10. The telemetry control unit may enable the tools 10 to transmit the data corresponding to the first data requests to the WDP interface 160. The wired drill pipe 100 may transmit the data to the first terminal 61. As a further example, if the first terminal 61 may access the mud pulse telemetry system 200 and/or the MWD module 260, the telemetry control unit may enable the MWD module 260 to transmit the second data requests to the tools 10. The telemetry control unit may enable the tools 10 to transmit the data corresponding to the second data requests to the MWD module 260. The mud pulse telemetry system 200 may transmit the data to the first terminal 61. If the WDP interface 160 transmits the first data requests, the telemetry control unit may prevent the MWD interface 260 from transmitting the second data requests. If the MWD interface 260 transmits the second data requests, the telemetry control unit may prevent the WDP interface 160 from transmitting the first data requests.

Figure 4A:
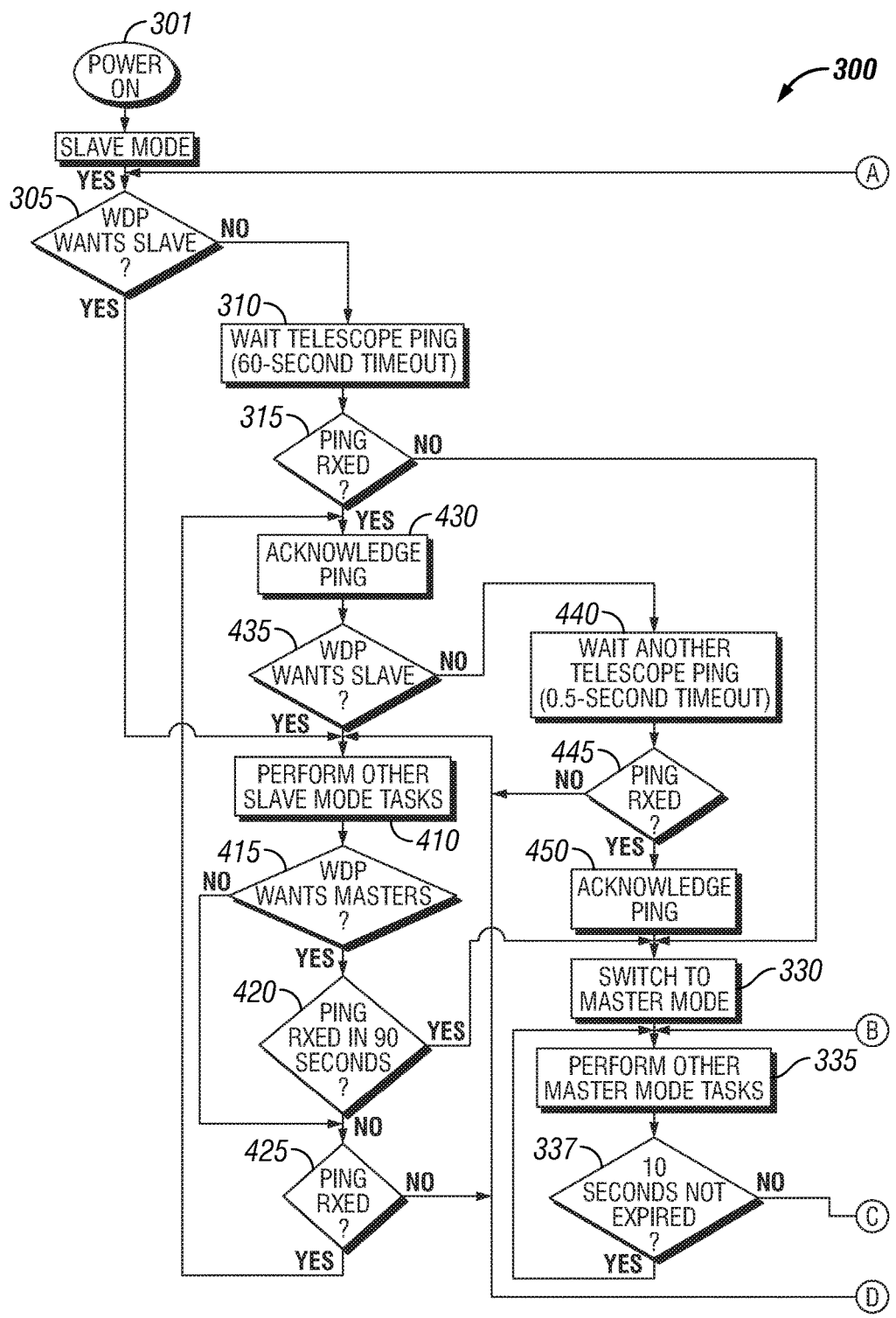
FIGS. 4A and 4B illustrate a flowchart of a method for managing and/or using drilling data in an embodiment of the present invention.
Figure 4B:
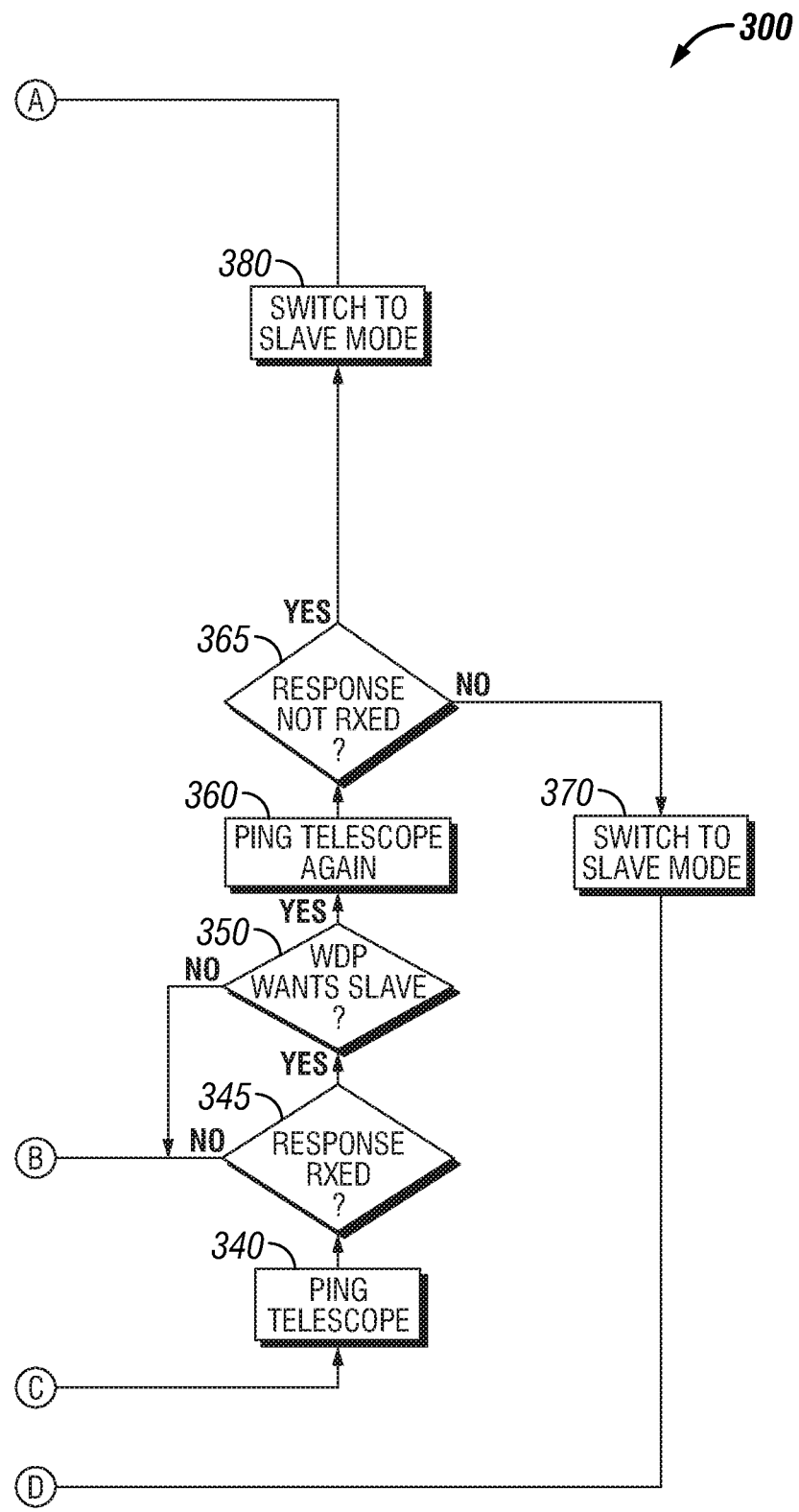

FIG. 4 generally illustrates a flowchart of a method 300 for using dual telemetry in oil drilling operations in an embodiment of the present invention. As generally shown at step 301, the drill string 14 may create the borehole 30, and/or the wired drill pipe 100 may obtain power. As generally shown at step 305, the wired drill pipe 100 may determine to be the "master" or the "slave."

If the wired drill pipe 100 determines to be the "master" at step 305, the wired drill pipe 100 may determine if the mud pulse telemetry system 200 may be available and/or functional as generally shown at step 315. For example, as generally shown at step 310, the wired drill pipe 100 may wait for a message from the mud pulse telemetry system 200 for a time period, such as, for example, sixty seconds. At step 315, the wired drill pipe 100 may determine if the mud pulse telemetry system 200 may be available and/or functional based on whether the wired drill pipe 100 received the message from the mud pulse telemetry system 200 during the time period.

If the wired drill pipe 100 determines that the mud pulse telemetry system 200 may be functional and/or operational at step 315, the wired drill pipe 100 may operate as the "master" as generally shown at step 330. For example, the wired drill pipe 100 may operate as the "master" by transmitting the first data requests to the tools 10 and/or obtaining the MWD data from the MWD module 260 as generally shown at step 335.

As generally shown at step 345, the wired drill pipe 100 may periodically determine if the mud pulse telemetry system 200 may be available and/or functional. For example, the wired drill pipe 100 may periodically transmit a "ping" message to the mud pulse telemetry system 200, such as, for example, every ten seconds as generally shown at step 337. The wired drill pipe 100 may transmit the "ping" message to the mud pulse telemetry system 200 as generally shown at step 340. At step 345, the wired drill pipe 100 may determine if the mud pulse telemetry system 200 may be available and/or functional based on whether the wired drill pipe 100 receives a response to the "ping" message. The wired drill pipe 100 may determine that the mud pulse telemetry system 200 may not be available and/or functional at step 345, such as, for example, if the wired drill pipe 100 does not receive a response to the "ping" message. If the wired drill pipe 100 determines that the mud pulse telemetry system 200 may not be available and/or functional at step 345, the wired drill pipe 100 may continue to operate as the "master" as generally shown at step 335.

The wired drill pipe 100 may determine that the mud pulse telemetry system 200 may be available and/or functional at step 345, such as, for example, if the wired drill pipe 100 receives the response to the "ping" message. If the wired drill pipe 100 determines that the mud pulse telemetry system 200 may be available and/or functional at step 345, the wired drill pipe 100 may determine whether to continue to be the "master" or to become the "slave" as generally shown at step 350. If the wired drill pipe 100 determines to continue to be the "master" at step 350, the wired drill pipe 100 may continue to operate as the "master" as generally shown at step 335. For example, the wired drill pipe 100 may continue to transmit the first data requests to the tools 10.

If the wired drill pipe 100 determines to become the "slave" at step 350, the wired drill pipe 100 may transmit an additional "ping" message to the mud pulse telemetry system 200 to ensure availability and/or functionality of the mud pulse telemetry system 200 as generally shown at step 360. The wired drill pipe 100 may determine the availability and/or the functionality of the mud pulse telemetry system 200 based on whether the wired pipe telemetry system 100 receives a response to the additional "ping" message as generally shown at step 365. The wired drill pipe 100 may become the "slave" as generally shown at steps 370 and 380.

If the wired drill pipe 100 determines to be the "slave" at step 305, the wired drill pipe 100 may operate as the "slave" as generally shown at step 410. For example, the wired drill pipe 100 may not transmit the first data requests during operation as the "slave." As generally shown at step 415, the wired drill pipe 100 may determine whether to continue operation as the "slave."

If the wired drill pipe 100 determines to become the "master" at step 415, capability of the wired drill pipe 100 to transmit the first data may be determined as generally shown at step 420. For example, determination of the capability of the wired drill pipe 100 to transmit the first data may be based on whether the wired drill pipe 100 receives a "ping" message from the surface 29. For example, the wired drill pipe 100 may determine whether a "ping" message is received from the surface 29 during a time period, such as, for example, within ninety seconds after determining to be the "master." If the wired drill pipe 100 receives the "ping" message from the surface 29 at step 420, the wired drill pipe 100 may acknowledge receipt of the "ping" message as generally shown at step 430. The wired drill pipe 100 may determine to continue operation as the "slave" or to become the "master" as generally shown at step 435.

If the wired drill pipe 100 determines to become the "master" at step 435, the wired drill pipe 100 may operate as the "master" as generally shown at step 335. For example, the wired drill pipe 100 may operate as the "master" by transmitting the first data requests to the tools 10 and/or obtaining the MWD data from the MWD module 260. If the wired drill pipe 100 determines to operate as the "slave" at step 435, the wired drill pipe 100 may operate as the "slave" as generally shown at step 410.

Figure 5A:
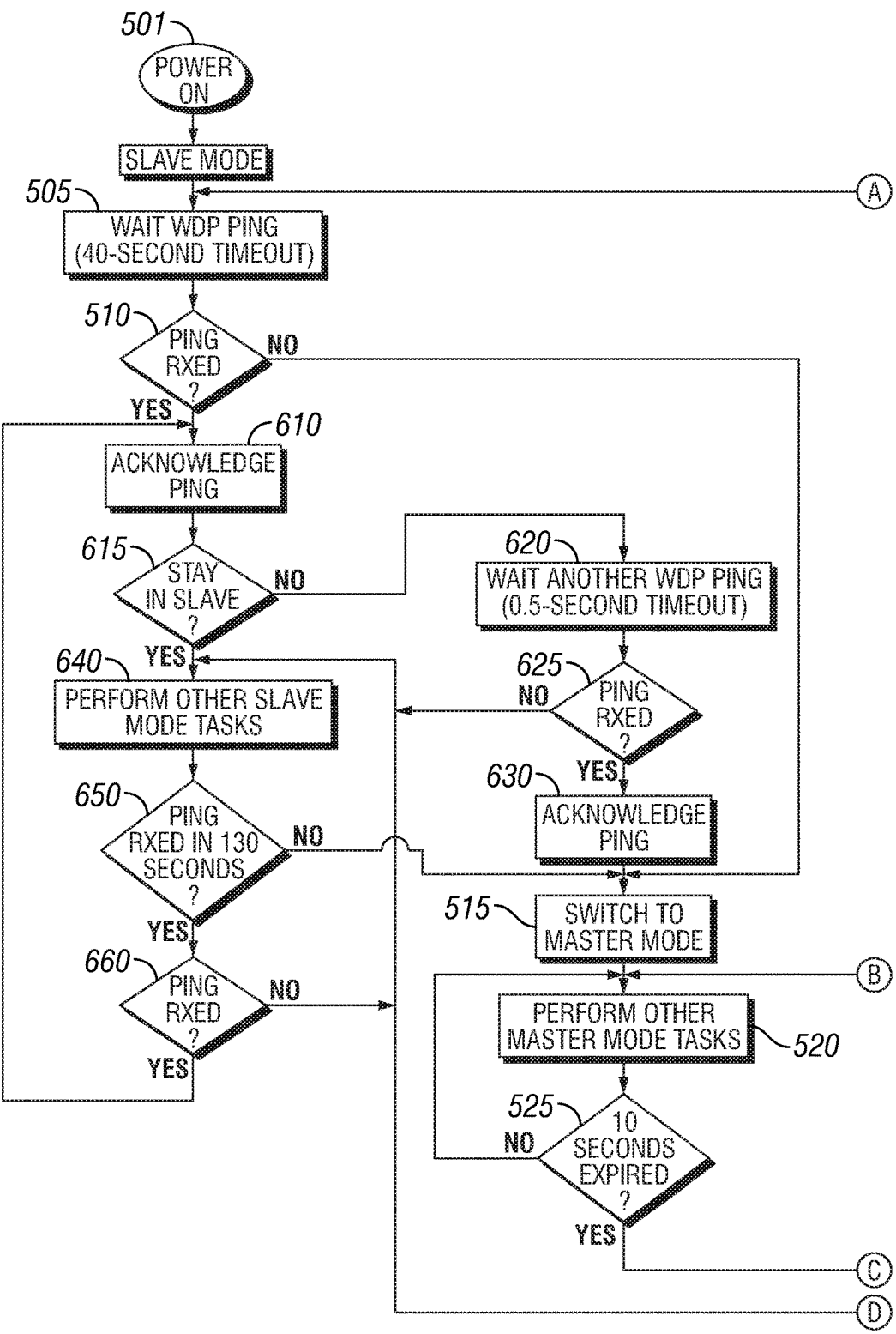
FIGS. 5A and 5B illustrate a flowchart of a method for managing and/or using drilling data in an embodiment of the present invention.
Figure 5B:
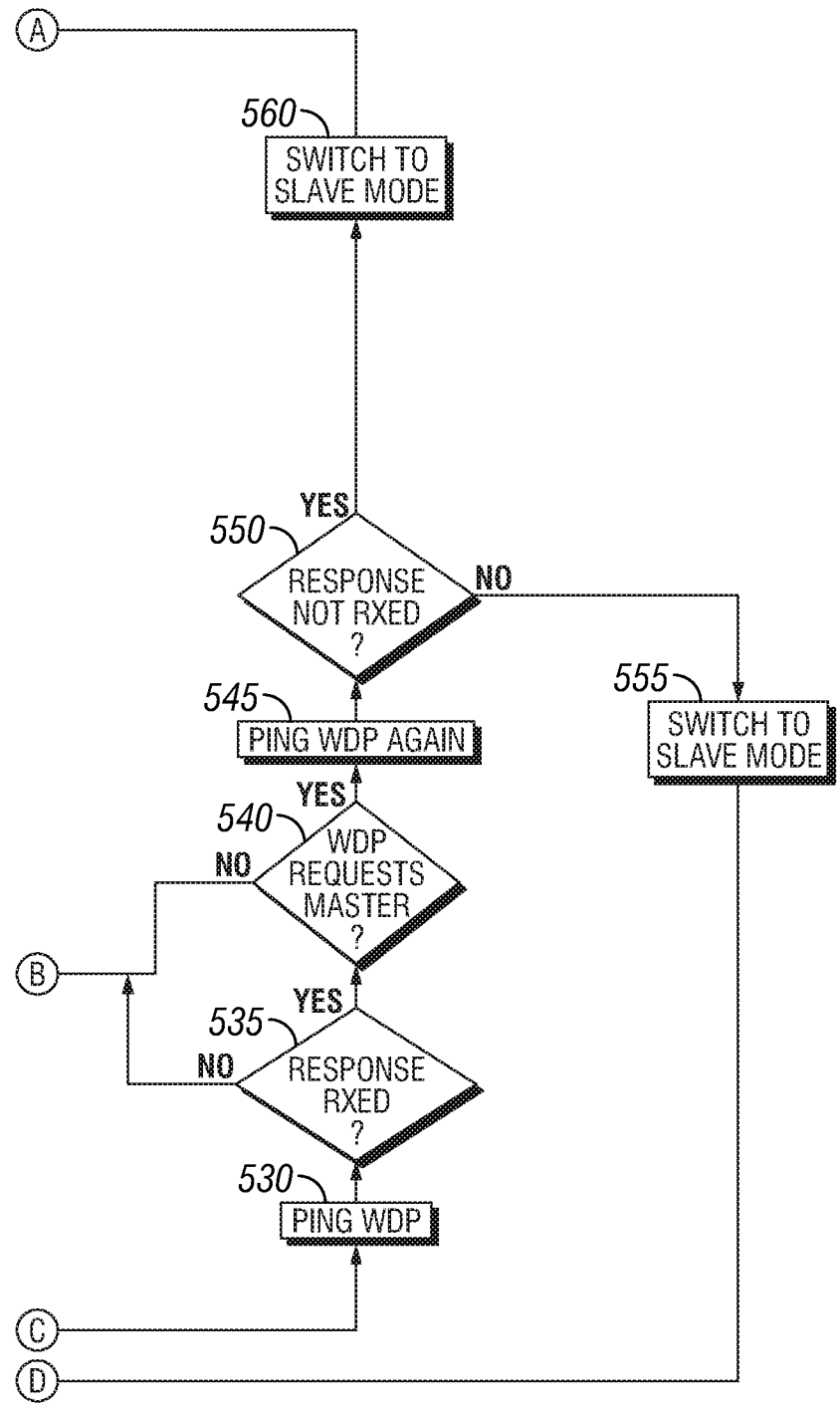

FIG. 5 generally illustrates a flowchart of a method 500 for using dual telemetry in oil drilling operations in an embodiment of the present invention. As generally shown at step 501, the drill string 14 may create the borehole 30, and/or the mud pulse telemetry system 200 may obtain power. The mud pulse telemetry system 200 may operate as the "slave." As generally shown at step 510, the mud pulse telemetry 200 may determine if the wired drill pipe 100 may be available and/or functional. For example, the mud pulse telemetry system 200 may wait for a message from the wired drill pipe 100 for a time period, such as, for example, forty seconds as generally shown at step 505. At step 510, the mud pulse telemetry system 200 may determine if the wired drill pipe 100 may be available and/or functional based on whether the mud pulse telemetry system 200 received the message from the wired drill pipe 100 during the time period.

If the mud pulse telemetry system 200 determines that the wired drill pipe 100 may not be available and/or functional at step 510, the mud pulse telemetry system 200 may become the "master" as generally shown at step 515. For example, the mud pulse telemetry system 200 may operate as the "master" by transmitting the second data requests to the tools 10 as generally shown at step 520.

As generally shown at step 535, the mud pulse telemetry system 200 may periodically determine if the wired drill pipe 100 may be available and/or functional. For example, the mud pulse telemetry system 200 may periodically transmit a "ping" message to the wired drill pipe 100, such as, for example, every ten seconds as generally shown at step 525. The mud pulse telemetry system 200 may transmit the "ping" message to the wired drill pipe 100 as generally shown at step 530. At step 535, the mud pulse telemetry system 200 may determine if the wired drill pipe 100 may be available and/or functional based on whether the mud pulse telemetry system 200 received a response to the "ping" message. If the mud pulse telemetry system 200 determines that the wired drill pipe 100 may not be available and/or functional at step 535, the mud pulse telemetry system 200 may continue to operate as the "master" as generally shown at step 520.

The mud pulse telemetry system 200 may determine that the wired drill pipe 100 may be available and/or functional at step 535, such as, for example, if the mud pulse telemetry system 200 receives the response to the "ping" message. The wired drill pipe 100 may request to be the "master" as generally shown at step 540. If the mud pulse telemetry system 200 determines that the wired drill pipe 100 may be available and/or functional, the mud pulse telemetry system 200 may transmit an additional "ping" message to ensure that the wired drill pipe 100 may be available and/or functional as generally shown at step 545. If the wired drill pipe 100 requests to be the "master" at step 540, the mud pulse telemetry system 200 may transmit the additional "ping" message at step 545. The mud pulse telemetry system 200 may determine availability and/or the functionality of the wired drill pipe 100 based on whether the mud pulse telemetry system 200 receives a response to the additional "ping" message as generally shown at step 550. The wired mud pulse telemetry system 200 may become the "slave" as generally shown at steps 555 and 560.

If the mud pulse telemetry system 200 receives the "ping" message from the wired drill pipe 100 at step 510, the mud pulse telemetry system 200 may acknowledge receipt of the "ping" message as generally shown at step 610. The mud pulse telemetry system 200 may determine whether to become the "master" or to continue operation as the "slave" at step 615. If the mud pulse telemetry system 200 determines to operate as the "master" at step 615, the mud pulse telemetry system 200 may operate as the "master" as generally shown at step 515.

If the mud pulse telemetry system 200 determines to continue operation as the "slave" at step 615, the mud pulse telemetry system 200 may operate as the "slave" as generally shown at step 640. The mud pulse telemetry system 200 may determine that the wired drill pipe 100 may not be available and/or functional at step 650. For example, the mud pulse telemetry system 200 may determine that the wired drill pipe 100 may not be available and/or functional based on whether the mud pulse telemetry system 200 receives a message from the wired drill pipe 100. If the mud pulse telemetry system 200 determines that the wired drill pipe 100 may not be available and/or functional at step 650, the mud pulse telemetry system 200 may become the "master" as generally shown at step 515.

Thus, the wired drill pipe 100 and the mud pulse telemetry system 200 may coordinate communication with the surface location 29. The wired drill pipe 100 or the mud pulse telemetry system 200 may communicate with the surface location 29 if communication using the other telemetry system is interrupted. The wired drill pipe 100 and the mud pulse telemetry system 200 may have a master/slave relationship so that data requests from a specific telemetry system do not interfere with data requests from the other telemetry system.

It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

We claim:

1. A dual telemetry system for transmitting information from a borehole comprising:
   a tool associated with a drill string;
   a first telemetry system connected to the tool wherein the first telemetry system transmits first data requests to the tool and further wherein the tool transmits first data to the first telemetry system in response to the first data requests while the first telemetry system is in the borehole; and
   a second telemetry system connected to the tool wherein the second telemetry system transmits second data requests to the tool and further wherein the tool transmits second data to the second telemetry system in response to the second data requests while the second telemetry system is in the borehole and further wherein the first telemetry system does not transmit the first data requests if the second telemetry system is transmitting the second data requests,
   wherein the first telemetry system and the second telemetry system have a master/slave relationship in which they alternate as master and slave, with the first telemetry system being the master and the second telemetry system being the slave in a first time period and the first telemetry system being the slave and the second telemetry system being the master in a second time period.

2. The system of claim 1, wherein the first time period and the second time period cycle such that the first telemetry system and the second telemetry system continuously alternate between functioning as the master.

3. The system of claim 1 wherein the second telemetry system does not transmit the second data requests if the first telemetry system is transmitting the first data requests.

4. The system of claim 3 further comprising:
   a control unit connected to the first telemetry system and the second telemetry system wherein the control unit determines whether the first data requests or the second data requests are transmitted and further wherein the control unit is located in the borehole.

5. The system of claim 1 further comprising:
   a tool bus that connects the tool to the first telemetry system and the second telemetry system wherein the tool bus transmits the first data requests, the second data requests, the first data and the second data.

6. The system of claim 1 further comprising:
   a terminal connected to the first telemetry system and the second telemetry system wherein the terminal generates a report based on the first data and the second data.

7. The system of claim 1 wherein the first telemetry system is a wired drill pipe telemetry system having a plurality of wired drill pipe joints connected to transmit the first data and further wherein the second telemetry system is a mud pulse telemetry system utilizing drilling fluid within the drill string to transmit the second data.

8. The system of claim 1 further comprising:
   a control application provided by a terminal connected to the first telemetry system and the second telemetry system wherein the control application transmits a message that directs the first telemetry system to transmit the first data requests and directs the second telemetry system to not transmit the second data requests.

9. A method for using dual telemetry for communicating with a tool associated with a drill string in a borehole, the method comprising the steps of:
   connecting a first telemetry system and a second telemetry system to the tool wherein the first telemetry system and the second telemetry system have a master/slave relationship with the first telemetry system being the master and the second telemetry system being the slave in a first time period and the first telemetry system being the slave and the second telemetry system being the master in a second time period and wherein the first telemetry system is configured to transmit first data requests to the tool and further wherein the second telemetry system is configured to transmit second data requests to the tool;
   transmitting at least one of the first data requests from the first telemetry system to the tool during the first time period wherein the second telemetry system does not transmit the second data requests if the first telemetry system is transmitting the first data requests; and
   transmitting data corresponding to the first data requests from the tool to the first telemetry system,
   wherein the first telemetry system and the second telemetry system are in the borehole.

10. The method of claim 9 further comprising:
    transmitting at least one of the second data requests from the second telemetry system to the tool during the second time period wherein the first telemetry system does not transmit the first data requests if the second telemetry system is transmitting the second data requests; and transmitting data corresponding to the second data requests from the tool to the second telemetry system.

11. The method of claim 9 wherein the first time period and the second time period cycle such that the first telemetry system and the second telemetry system continuously alternate between functioning as the master.

12. The method of claim 9 further comprising the steps of:
transmitting at least one of the second data requests from the second telemetry system to the tool if the first telemetry system is not capable of transmitting the data wherein the first telemetry system does not transmit the first data requests if the second telemetry system is transmitting the second data requests.

13. The method of claim 9 further comprising the step of:
transmitting a portion of the data corresponding to the first data requests to a terminal located at the surface using the second telemetry system.

14. The method of claim 9 further comprising the steps of:
transmitting a first message to the second telemetry system wherein the second telemetry system transmits a second message to the first telemetry system in response to the first message.

15. The method of claim 9 further comprising the steps of:
transmitting a message from the first telemetry system to the second telemetry system; and transmitting at least one of the second data requests from the second telemetry system to the tool in response to the message wherein the first telemetry system does not transmit the first data requests during transmittal of the second data requests from the second telemetry system.

16. The method of claim 9 further comprising the step of:
transmitting the data corresponding to the first data requests to a terminal located at the surface using the first telemetry system.

* * * * *